United States Patent
Bhatia et al.

(10) Patent No.: US 7,920,870 B1
(45) Date of Patent: Apr. 5, 2011

(54) SYSTEM AND METHOD FOR ADAPTIVE CONFIGURATION OF CELL STRUCTURE BASED ON THE POSITION OF MOBILE STATIONS

(75) Inventors: Ranjit Bhatia, Plano, TX (US); Bagher Zadeh, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/475,324

(22) Filed: Dec. 30, 1999

(51) Int. Cl.
*H04Q 7/20* (2006.01)

(52) U.S. Cl. ....................................... 455/444; 455/446

(58) Field of Classification Search .................. 455/444, 455/446, 450, 434, 422, 404, 403, 456.1, 455/452.2, 447, 436, 449, 443, 448; 370/252, 370/339, 340
See application file for complete search history.

(56) References Cited

U.S. PATENT DOCUMENTS

| | | | | |
|---|---|---|---|---|
| 4,947,452 A | * | 8/1990 | Hattori et al. | 455/440 |
| 5,164,958 A | * | 11/1992 | Omura | 375/140 |
| 5,551,060 A | * | 8/1996 | Fujii et al. | 455/447 |
| 5,758,090 A | * | 5/1998 | Doner | 370/342 |
| 6,091,955 A | * | 7/2000 | Aalto et al. | 455/447 |
| 6,128,328 A | * | 10/2000 | Schilling | 455/446 |
| 6,212,385 B1 | * | 4/2001 | Thomas et al. | 455/447 |
| 6,285,669 B1 | * | 9/2001 | Gutierrez | 370/341 |
| 6,408,185 B1 | * | 6/2002 | Freeman et al. | 455/446 |
| 6,430,168 B1 | * | 8/2002 | Djurkovic et al. | 455/444 |
| 2002/0102976 A1 | * | 8/2002 | Newbury et al. | 455/436 |
| 2003/0109284 A1 | * | 6/2003 | Akerberg et al. | 455/561 |

* cited by examiner

*Primary Examiner* — Nguyen T. Vo
*Assistant Examiner* — Kamran Afshar

(57) ABSTRACT

A telecommunications system and method is disclosed for adaptively configuring the cell structure of a cell having at least two carrier frequencies between an overlaid/underlaid (OL/UL) sub-cell structure and a normal cell structure based on the position of mobile stations within the cell. A Base Station Controller (BSC) for the cell determines the position of all of the mobile stations involved in a call connection within the cell relative to the cell site. If the number of mobile stations within a predefined distance from the cell site is greater than a channel threshold, the BSC adapts the cell configuration to the OL/UL sub-cell structure. The channel threshold is an operator-defined percentage of available channels (throughout the cell or within either the overlaid or underlaid cell). However, if the BSC determines that the percentage of mobile stations closer than the predefined distance is less than the channel threshold, the BSC maintains the normal cell structure.

27 Claims, 4 Drawing Sheets

SYSTEM AND METHOD FOR ADAPTIVE CONFIGURATION OF CELL STRUCTURE BASED ON THE POSITION OF MOBILE STATIONS

BACKGROUND OF THE PRESENT INVENTION

1. Field of the Invention

The present invention relates generally to telecommunications systems and methods for reducing interference in cellular networks, and specifically to configuring the cell structure in cellular networks in order to reduce interference.

2. Background of the Present Invention

In modern cellular systems, the quality of the radio network highly depends upon the interference level in the network. The interference level is usually defined by the carrier to interference (C/I) ratio, which is the ratio of the level of the received desired signal to the level of the received undesired signal. The undesired signal can be a signal of the same frequency from a different cell (co-channel interference) or a signal of an adjacent frequency from a different cell (adjacent channel interference). In either case, the distribution of the C/I ratio throughout the network determines the type of frequency re-use pattern used in the network.

Since the number of frequencies available for cellular telecommunications are limited, frequency re-use patterns are necessary to provide cellular coverage to a geographic region. Frequency re-use is defined as the use of radio channels on the same carrier frequency, covering geographically different areas. Conventionally, these areas must be separated from each other by a sufficient distance in order to avoid co-channel interference.

However, various mechanisms, such as frequency hopping, power control and DTX, have been developed to reduce the interference in the cellular network without requiring an increase in the number of utilized frequency groups. Therefore, some cellular networks have been able to apply aggressive frequency re-use patterns, such as the 1/3 pattern, which uses only three frequency groups in a single site re-use pattern. These aggressive frequency re-use patterns also provide increased traffic capacity in the networks.

As is understood in the art, the traffic capacity in a cellular network can be increased by utilizing more frequencies or reducing the frequency re-use distance. If the number of available frequencies is limited, the only way to increase the capacity without building new sites is to reduce the frequency re-use distance. However, reducing the frequency re-use distance typically increases the interference in the network. Therefore, in addition to, or instead of, implementing an aggressive frequency re-use pattern, an overlaid/underlaid sub-cell structure can be introduced in order to increase the radio network capacity.

The overlaid/underlaid (OL/UL) sub-cell structure adds a second frequency re-use pattern to the cellular network with a shorter re-use distance than the existing re-use pattern. The cells using this second re-use pattern are typically restricted in size (lower power) to make a shorter re-use distance possible without creating excessive interference. These cells are termed overlaid sub-cells. The original cells that have overlaid cells associated with them are termed underlaid sub-cells.

This OL/UL sub-cell structure is created by dividing the available frequencies in the cellular network between the overlaid and underlaid sub-cells. Each overlaid sub-cell serves a smaller area than the corresponding underlaid sub-cell. Consequently, the number of frequencies per cell can be increased, thus providing an increased traffic capacity in the network without building new sites or adding more frequencies.

However, the OL/UL sub-cell structure only works when some of the mobile subscribers are positioned close to the base station. Therefore, in cases where many or all of the mobile subscribers are located near the corners of the cell, away from the base station, the OL/UL sub-cell structure may not provide any real benefit to the network operator or the mobile subscriber. Therefore, there is a need to adaptively switch between the OL/UL sub-cell structure and a normal cell structure, based on the relative position of the mobile subscribers in the cell.

SUMMARY OF THE INVENTION

The present invention is directed to telecommunications systems and methods for adaptively configuring the cell structure of a cell having at least two carrier frequencies between the OL/UL sub-cell structure and the normal cell structure, based on the position of the mobile stations within the cell. The Base Station Controller (BSC) determines the position of the mobile stations within the cell relative to the Base Transceiver Station (BTS) location. If the number of mobile stations within a predefined distance from the BTS is greater than a channel threshold, the BSC adapts the cell configuration to the OL/UL sub-cell structure. The channel threshold is an operator-defined percentage of available channels (throughout the cell or within either the overlaid or underlaid cell). However, if the BSC determines that the percentage of mobile stations closer than the predefined distance is less than the channel threshold, the BSC maintains the normal cell structure. Advantageously, embodiments of the present invention reduce the interference and complexity in the cellular network, while at the same time, increasing the cellular network quality and capacity.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

Figure 1:
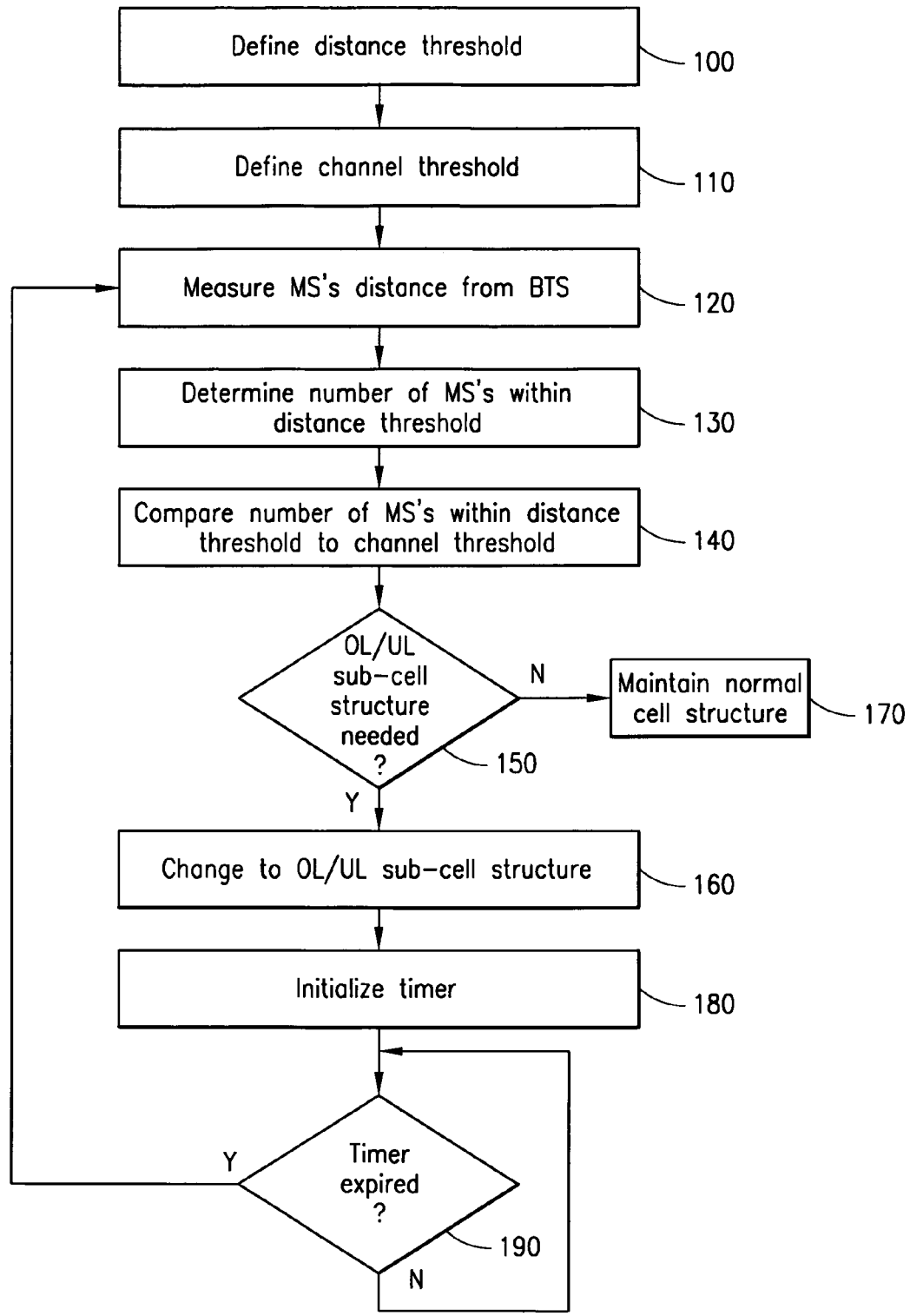
FIG. 1 is a flow diagram illustrating the steps for adaptively configuring the cell structure between an overlaid/underlaid (OL/UL) sub-cell structure and a normal cell structure in accordance with preferred embodiments of the present invention.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

With reference now to the steps listed in FIG. 1 of the drawings, which will be described in connection with FIGS. 2-4 of the drawings, a mechanism for adaptively configuring a cell 22 having at least two carrier frequencies (f1 and f2) associated therewith is shown. As a first step, the network operator for the cell 22 must first define a distance threshold 25 (step 100). This distance threshold 25 is preferably associated with a specific radial distance from a Base Transceiver Station (BTS) 24, as is shown in FIG. 2. The BTS 24 is shown for simplicity as an antenna, but should be understood to include all radio equipment needed for the cell 22.

As a next step, the network operator must also define a channel threshold 26 (step 110), which corresponds to an operator-defined number of traffic channels that are either in use or available. The decision as to whether the channel threshold 26 is associated with the number of available traffic channels or the number of traffic channels in use is also made by the network operator. Once defined, both the channel threshold 26 and the distance threshold 25 are stored in a Base Station Controller (BSC) 23 serving the BTS 24, as shown in FIGS. 2-4.

It should be understood that traffic channels carry speech and other data between the BTS 24 and Mobile Stations (MS's) 20a and 20b, which are the equipment used by the mobile subscribers to communicate with the cellular network. These traffic channels are a type of logical channel that is mapped onto a time slot of a specific carrier frequency f1 and f2. The number of time slots depends upon the type of cellular system. For example, in the Global System for Mobile Communications (GSM) system, each carrier frequency f1 and f2 is divided into eight time slots, with at least one time slot reserved for signaling information between the BTS 24 and the MS's 20a and 20b and the other seven time slots available as traffic channels.

Thus, the channel threshold 26 represents a percentage of logical channels allocated as traffic channels that are either in use or available. In addition, the channel threshold 26 can be set based upon the total number of traffic channels for all of the available carrier frequencies f1 and f2 in the cell 22, or upon only the number of traffic channels for one or more of the available carrier frequencies f1 or f2 in the cell 22.

The channel threshold 26 distinguishes between a cell 22 that has a number of MS's, e.g., MS 20a, close to the BTS 24, in which case an overlaid/underlaid (OL/UL) sub-cell structure can be applied, and a cell 22 that does not have many MS's, e.g., MS 20b, close to the BTS 24, in which case the normal cell structure should be applied. The OL/UL sub-cell structure works well in the situation where a number of MS's 20a are close to the BTS 24. If there were few or no MS's 20a close to the BTS 24, changing to an OL/UL sub-cell structure would not be beneficial, as the traffic capacity in the cell would be effectively decreased.

Once the distance threshold 25 and channel threshold 26 are defined, the process of adaptively configuring the cell 22 can begin. Initially, the BSC 23 starts with the normal cell structure, in which all of the available carrier frequencies f1 and f2 are active across the entire area of the cell 22. Thereafter, as shown in FIG. 4, measurement logic 400 within the BSC 23 measures a distance D1 and D2 of each of the MS's 20a and 20b, respectively, involved in a call connection in the cell 22 from the BTS 24 (step 120). For example, the BSC 23 can obtain a respective Timing Advance (TA) value from each of the MS's 20a and 20b, which provides the BSC 23 with a respective radius around the BTS 24 that each of the MS's 20a and 20b is located within, and use these respective radius' as the distance measurements D1 and D2, respectively. Alternatively, the BSC 23 can obtain coordinate location information for each of the MS's 20a and 20b using a network-based positioning method or an MS-based positioning method, such as the Global Positioning System (GPS), and determine the respective distance D1 and D2 from the BTS 24 based upon this coordinate location information.

Figure 4:
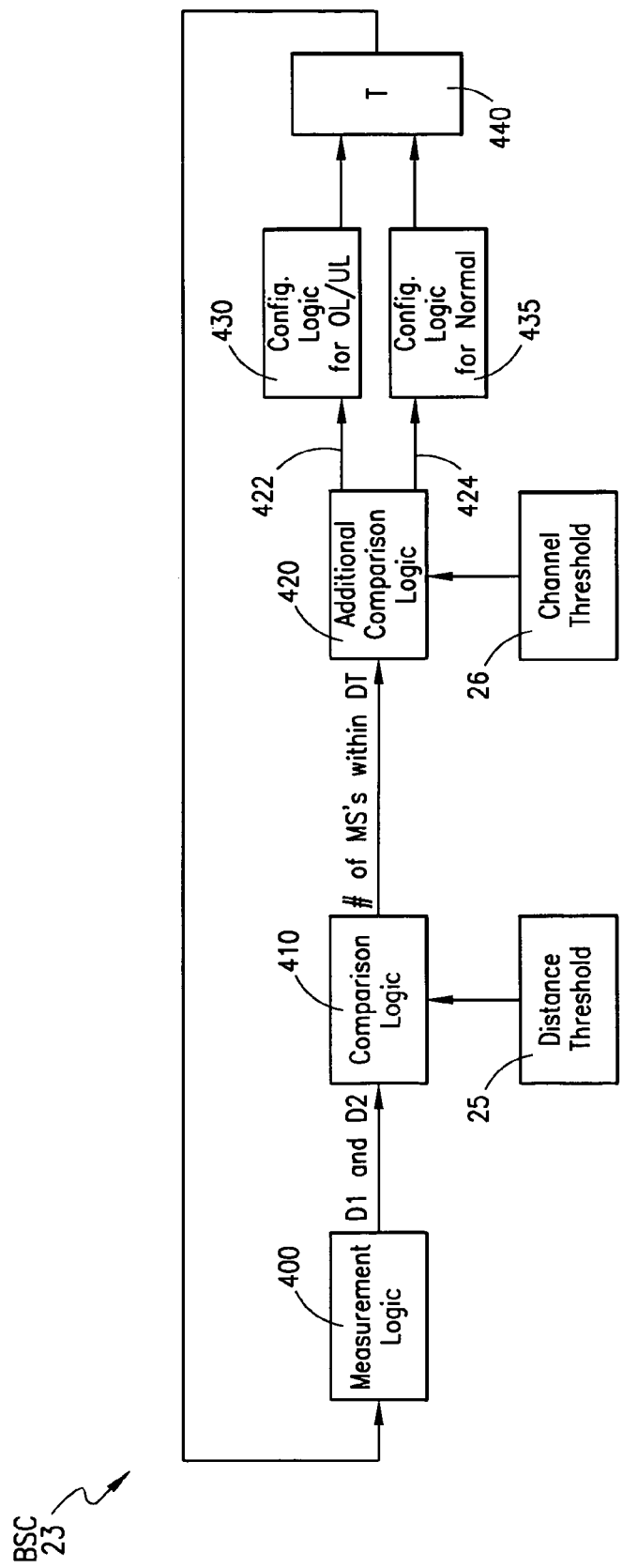
FIG. 4 is a block diagram of a base station controller configured to adaptively switch between the OL/UL sub-cell structure and the normal cell structure.

Once the distance from the BTS 24 for each of the MS's 20a and 20b involved in a call connection is known (step 120), as shown in FIG. 4, the BSC 23 inputs each of these measured distances D1 and D2 to comparison logic 410, which compares each of these distances D1 and D2 with the distance threshold 25 to determine the number of MS's 20a and 20b having a respective distance D1 and D2 from the BTS 24 less than the distance threshold 25 (step 130). For example, the distance threshold 25 can be the radius of a desired underlaid sub-cell 22b, as shown in FIG. 2.

Thereafter, the BSC 23 inputs the determined number of MS's 20a and 20b having a distance D1 and D2, respectively, from the BTS 24 less than the distance threshold 25 to additional comparison logic 420, which compares this number to the channel threshold 26 (step 140) to determine whether to change the cell structure to the OL/UL sub-cell structure (step 150). If the additional comparison logic 420 determines that the structure of the cell 22 should be changed to the OL/UL sub-cell structure, an output 422 of the additional comparison logic 420 goes to configuration logic for the OL/UL sub-cell structure 430, and the cell structure is changed to the OL/UL sub-cell structure (step 160). Otherwise, an output 424 of the additional comparison logic 420 goes to configuration logic for the normal cell structure 435, and the normal cell structure is maintained (step 170).

In one embodiment, if the channel threshold 26 is defined as a certain number of traffic channels in use, and if the number of MS's 20a having a distance D1 less than the distance threshold 25 is greater than the channel threshold 26, the output 422 from the additional comparison logic 420 goes to the configuration logic 430 that changes the cell structure to the OL/UL sub-cell structure. For example, if the channel threshold 26 is three traffic channels in use, and there are five MS's involved in call connections within the cell 22, four of which have a distance less than the distance threshold 25, the BSC 23 would change to an OL/UL sub-cell structure.

In an alternative embodiment, if the channel threshold 26 is defined as a certain number of available traffic channels, the BSC 23 would change to an OL/UL sub-cell structure only when the number of MS's 20a and 20b involved in call connections having a distance D1 and D2, respectively, to the BTS 24 less than the distance threshold 25 is less than the channel threshold 26. For example, if the channel threshold 26 is five traffic channels available, and there are five MS's involved in call connections within the cell 22, four of which have a distance less than the distance threshold 25, the BSC 23 would change to an OL/UL sub-cell structure.

An example of an OL/UL sub-cell structure is shown in FIG. 2. Since the BTS 24 has at least two separate Transceiver Units (TRUs) TRU1 and TRU2, each having a different carrier frequency f1 and f2, respectively, associated therewith, TRU1, which has frequency f1 associated therewith, becomes associated with an underlaid sub-cell 22a, which serves the entire area of the cell 22. In addition, TRU2, which has frequency f2 associated therewith, becomes associated with an overlaid sub-cell 22b, which serves a smaller area of the cell 22 than the underlaid sub-cell 22a.

This OL/UL sub-cell structure is accomplished by lowering the BTS 24 power of TRU2 with respect to the BTS 24 power of TRU1. Advantageously, by changing to an OL/UL sub-cell structure, the traffic capacity in the cell 22 remains the same, but the interference in the cell 22 decreases, due to the smaller size of the overlaid sub-cell 22b (increased frequency re-use distance).

Figure 3:
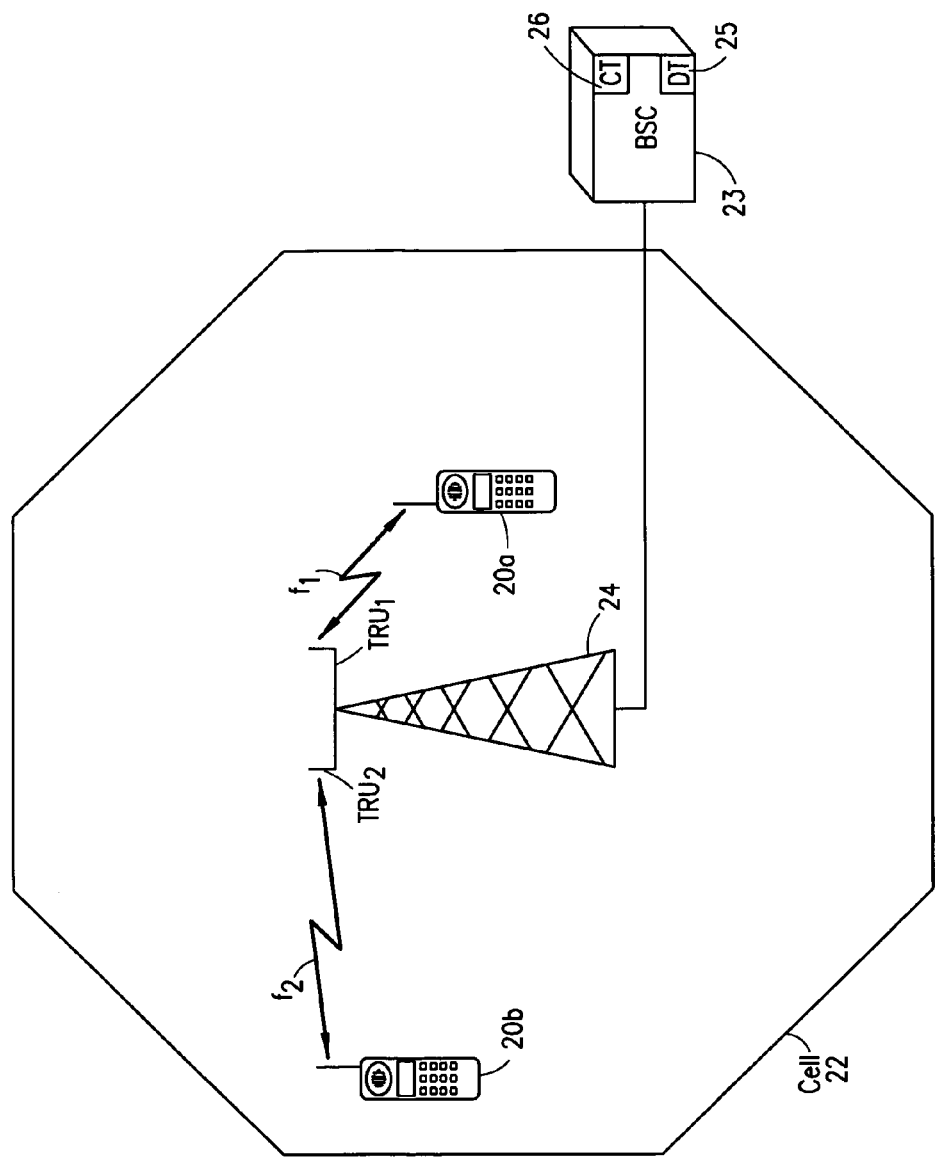
FIG. 3 is a block diagram illustrating the normal cell structure.

An example of a normal cell structure is shown in FIG. 3. The normal cell structure has multiple TRU's TRU1 and TRU2, each with the same power, so that all of the carrier frequencies f1 and f2, respectively, can serve the same area (the entire area of the cell 22). In this case, any MS 20a or 20b anywhere in the cell 22 can be assigned to a traffic channel on either TRU1 or TRU2, and thus communicate with the BTS 24 over either available carrier frequency f1 or f2, respectively. Although the traffic capacity in the normal cell structure is the same as in the OL/UL sub-cell structure, the interference in the normal cell structure may increase due to the shorter frequency re-use distance of all carrier frequencies f1 and f2.

It should be understood that although the BTS 24 is shown at the center of the cell 22 in FIGS. 2 and 3, in different frequency re-use patterns, such as the 3/9 and 4/12 patterns, the BTS 24 may be located at an intersection between three cells, with the BTS 24 having three antenna pointing azimuths (not shown), one for each cell. In these situations, the overlaid sub-cell 22b usually extends radially out from the intersection of the three cells to a diameter smaller than the diameter of the underlaid sub-cell 22a. Therefore, in order to accommodate these type of frequency re-use patterns, instead of defining a specific distance from the BTS 24 as the distance threshold 25, the distance threshold 25 can be a function describing the shape of the desired overlaid sub-cell 22b.

Figure 2:
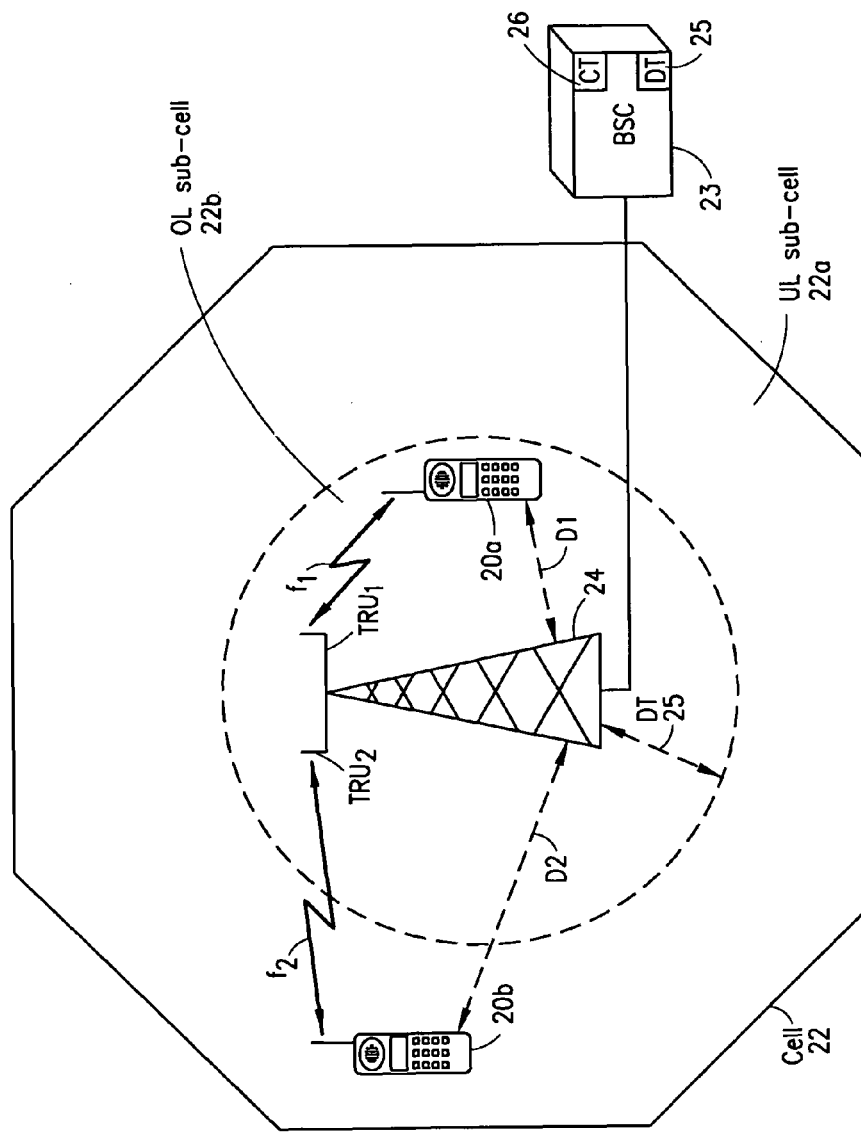
FIG. 2 is a block diagram illustrating the OL/UL sub-cell structure in accordance with embodiments of the present invention.

With reference again to the steps listed in FIG. 1, and the BSC 23 diagram of FIG. 4, once the cell 22 has been configured, the BSC 23 can either repeat the process immediately, or preferably, to reduce the amount of processing within the BSC 23, the BSC can initialize a timer 440 having a period set by the network operator (step 180). Upon the expiration of the timer 440 (step 190), the BSC 23 repeats the process, and obtains new distance measurements D1 and D2 for all MS's 20a and 20b currently involved in a call connection in the cell 22 (step 120).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A base station controller for adaptively configuring the structure of a cell served by said base station controller, said cell having a plurality of mobile stations located therein and a base transceiver station associated therewith, said base transceiver station having at least two carrier frequencies associated therewith, said base station controller comprising:
    measurement logic adapted to determine a respective distance of each of said mobile stations involved in a call connection within said cell from said base transceiver station;
    first comparison logic adapted to compare each said respective distance to a distance threshold to determine a number of said mobile stations having said respective distance less than or equal to said distance threshold;
    second comparison logic adapted to perform a comparison of said number to a channel threshold; and
    configuration logic adapted to switch between an overlaid/underlaid sub-cell structure having at least one of said at least two carrier frequencies serving only a portion of said cell and a normal cell structure having all of said at least two carrier frequencies serving the entire area of said cell based on the results of said comparison.

2. The base station controller of claim 1, wherein said channel threshold is a number of traffic channels in use.

3. The base station controller of claim 2, wherein said configuration logic is adapted to switch to said overlaid/underlaid sub-cell structure when the results of said comparison indicate that said number of said mobile stations having said respective distance less than or equal to said distance threshold is greater than or equal to said channel threshold.

4. The base station controller of claim 1, wherein said channel threshold is a number of traffic channels available.

5. The base station controller of claim 4, wherein said configuration logic is adapted to switch to said overlaid/underlaid sub-cell structure when the results of said comparison indicate that said number of said mobile stations having said respective distance less than or equal to said distance threshold is less than or equal to said channel threshold.

6. The base station controller of claim 1, further comprising:
    a timer, said measurement logic being adapted to begin measuring each said respective distance upon the expiration of said timer.

7. The base station controller of claim 1, wherein each said respective distance is a radius around said base transceiver station, said distance threshold being an additional radius around said base transceiver station.

8. The base station controller of claim 1, wherein each said respective distance is a specific distance from said base transceiver station, said distance threshold being a radius around said base transceiver station.

9. The base station controller of claim 1, wherein each said respective distance is a specific distance from said base transceiver station, said distance threshold being a function describing the shape of an overlaid sub-cell of said overlaid/underlaid sub-cell structure.

10. The base station controller of claim 1, wherein said channel threshold is based on the number of traffic channels associated with only one of said at least two carrier frequencies.

11. The base station controller of claim 1, wherein said channel threshold is based on the number of traffic channels associated with at least two of said at least two carrier frequencies.

12. A telecommunications system for adaptively configuring the structure of a cell within a cellular network, said cell having a plurality of mobile stations located therein, said telecommunications system comprising:
    a base transceiver station within said cell in wireless communication with said plurality of mobile stations, said base transceiver station having at least two carrier frequencies associated therewith; and
    a base station controller connected to said base transceiver station, said base station controller being adapted to measure a respective distance of each of said mobile stations involved in a call connection within said cell from said base transceiver station, compare each said respective distance to a distance threshold to determine a number of said mobile stations having said respective distance less than or equal to said distance threshold, perform a comparison of said number to a channel threshold and switch between an overlaid/underlaid sub-cell structure having at least one of said at least two carrier frequencies serving only a portion of said cell and a normal cell structure having all of said at least two carrier frequencies serving the entire area of said cell based on the results of said comparison.

13. The telecommunications system of claim 12, wherein said channel threshold is a number of traffic channels in use.

14. The telecommunications system of claim 13, wherein said base station controller is adapted to switch to said overlaid/underlaid sub-cell structure when the results of said comparison indicate that said number of said mobile stations having said respective distance less than or equal to said distance threshold is greater than or equal to said channel threshold.

15. The telecommunications system of claim 12, wherein said channel threshold is a number of traffic channels available.

16. The telecommunications system of claim 15, wherein said base station controller is adapted to switch to said overlaid/underlaid sub-cell structure when the results of said comparison indicate that said number of said mobile stations having said respective distance less than or equal to said distance threshold is less than or equal to said channel threshold.

17. The telecommunications system of claim 12, wherein said base station controller further comprises a timer, said base station controller being adapted to begin measuring each said respective distance upon the expiration of said timer.

18. The telecommunications system of claim 12, wherein each said respective distance is a radius around said base transceiver station, said distance threshold being an additional radius around said base transceiver station.

19. The telecommunications system of claim 12, wherein each said respective distance is a specific distance from said base transceiver station, said distance threshold being a radius around said base transceiver station.

20. The telecommunications system of claim 12, wherein each said respective distance is a specific distance from said base transceiver station, said distance threshold being a function describing the shape of an overlaid sub-cell of said overlaid/underlaid sub-cell structure.

21. The telecommunications system of claim 12, wherein said base transceiver station has at least two transceiver units associated therewith, each of said at least two transceiver units having a respective one of said at least two carrier frequencies associated therewith.

22. The telecommunications system of claim 21, wherein said base station controller is adapted to switch to said overlaid/underlaid sub-cell structure by reducing the power to at least one of said at least two transceiver units.

23. A method for adaptively configuring the structure of a cell served by a base station controller, said cell having a plurality of mobile stations located therein and a base transceiver station associated therewith, said base transceiver station having at least two carrier frequencies associated therewith, said method comprising the steps of:
   determining a respective distance of each of said mobile stations involved in a call connection within said cell from said base transceiver station;
   comparing each said respective distance to a distance threshold to determine a number of said mobile stations having said respective distance less than or equal to said distance threshold;
   performing a comparison of said number to a channel threshold; and
   switching between an overlaid/underlaid sub-cell structure having at least one of said at least two carrier frequencies serving only a portion of said cell and a normal cell structure having all of said at least two carrier frequencies serving the entire area of said cell based on said step of performing.

24. The method of claim 23, wherein said channel threshold is a number of traffic channels in use, said step of switching further comprising the step of:
   switching to said overlaid/underlaid sub-cell structure when the results of said comparison indicate that said number of said mobile stations having said respective distance less than or equal to said distance threshold is greater than or equal to said channel threshold.

25. The method of claim 23, wherein said channel threshold is a number of traffic channels available, said step of switching further comprising the step of:
   switching to said overlaid/underlaid sub-cell structure when the results of said comparison indicate that said number of said mobile stations having said respective distance less than or equal to said distance threshold is less than or equal to said channel threshold.

26. The method of claim 23, further comprising the steps of:
   initializing a timer, said step of measuring each said respective distance being performed upon the expiration of said timer.

27. The method of claim 23, wherein said base transceiver station has at least two transceiver units associated therewith, each of said at least two transceiver units having a respective one of said at least two carrier frequencies associated therewith, said step of switching further comprising the step of:
   switching to said overlaid/underlaid sub-cell structure by reducing the power to at least one of said at least two transceiver units.

* * * * *